(12) United States Patent
Berger et al.

(10) Patent No.: US 7,453,067 B2
(45) Date of Patent: Nov. 18, 2008

(54) DETECTOR WITH A SCINTILLATOR, AND IMAGING UNIT HAVING SUCH A DETECTOR

(75) Inventors: Frank Berger, Erlangen (DE); Michael Miess, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 43 days.

(21) Appl. No.: 11/366,450

(22) Filed: Mar. 3, 2006

(65) Prior Publication Data
US 2006/0202128 A1  Sep. 14, 2006

(30) Foreign Application Priority Data
Mar. 4, 2005  (DE) .................... 10 2005 010 077

(51) Int. Cl.
*G01T 1/20* (2006.01)
*H01L 31/0216* (2006.01)
(52) U.S. Cl. ............. 250/370.11; 250/367; 257/E31.12
(58) Field of Classification Search ............ 250/370.09, 250/370.11, 368, 367, 363.02, 361 R
See application file for complete search history.

(56) References Cited

U.S. PATENT DOCUMENTS

| | | | | |
|---|---|---|---|---|
| 5,059,800 A | * | 10/1991 | Cueman et al. ............. 250/367 |
| 5,153,438 A | * | 10/1992 | Kingsley et al. ........ 250/370.09 |
| 5,506,409 A | * | 4/1996 | Yoshida et al. .............. 250/368 |
| 6,278,118 B1 | * | 8/2001 | Homme et al. ......... 250/370.11 |
| 6,483,115 B1 | * | 11/2002 | Castleberry ............ 250/370.11 |
| 6,657,201 B2 | * | 12/2003 | DeJule .................. 250/370.11 |
| 6,921,909 B2 | * | 7/2005 | Nagarkar et al. ......... 250/483.1 |
| 7,230,247 B2 | * | 6/2007 | Shibayama ............ 250/370.11 |
| 2002/0153492 A1 | * | 10/2002 | Sekine et al. .......... 250/370.11 |
| 2003/0150994 A1 | * | 8/2003 | Freund et al. ............... 250/368 |
| 2004/0104351 A1 | * | 6/2004 | Shibayama ............ 250/370.11 |

* cited by examiner

*Primary Examiner*—Christine Sung
*Assistant Examiner*—Faye Boosalis
(74) *Attorney, Agent, or Firm*—Harness, Dickey & Pierce, P.L.C.

(57) ABSTRACT

A detector is disclosed, including at least one scintillator and at least one photodiode, connected to one another by a connecting medium. The scintillator has a defined depression for holding the connecting medium on its side facing the photodiode in such a way that the visible light produced by the scintillator is focused in the direction of the photodiode. The detector is provided for an imaging X-ray unit, for example a computed tomography unit.

16 Claims, 4 Drawing Sheets

DETECTOR WITH A SCINTILLATOR, AND IMAGING UNIT HAVING SUCH A DETECTOR

The present application hereby claims priority under 35 U.S.C. §119 on German patent application number DE 10 2005 010 077.5 filed Mar. 4, 2005, the entire contents of which is hereby incorporated herein by reference.

FIELD

The invention generally relates to a detector, such as one having at least one scintillator and at least one photodiode, for example. They may be connected to one another by a connecting medium. The invention also generally relates to an imaging unit having such a detector.

BACKGROUND

A detector may be used, for example, to detect X-radiation in an X-ray unit, for example in a computed tomography unit. The detector generally includes a number of detector modules that are arranged in a row one after another or in two dimensions to form a larger detector surface. Each detector module has a scintillator array and a photodiode array that are aligned relative to one another and connected to one another by an adhesive that also serves as an optical coupling layer. The scintillator array has a multiplicity of scintillator elements that are separated from one another by inactive areas, so called septa. The photodiode array also has a multiplicity of photodiodes that are separated from one another by inactive zones.

If, during operation of the X-ray unit, X-radiation that has passed through an examination object, for example a patient, and is therefore attenuated, strikes an element of the scintillator array, it is converted into visible light. The visible light is guided through the optical coupling layer in the form of the adhesive to the photodiode, assigned to the element of the scintillator array, of the photodiode array, which converts the visible light into electric signals. The electric signals originating from the photodiodes of the photodiode array are subsequently processed further. Images of the examination object are reconstructed from the measurement signals that have been further processed, this being done with the aid of a computer.

When converting X-radiation into visible light in a scintillator element, the problem arises that the visible light produced is intrinsically scattered diffusely. It follows that there is an undirected exit of the light into the optical coupling layer from the scintillator element on the side thereof assigned to a photodiode. Consequently, a portion of the light produced in the scintillator element is not passed directly on to the photodiode assigned to the scintillator element, but undesirably reaches an adjacent photodiode, which is assigned to another scintillator element, bilateral crosstalk along the optical coupling layer. This fraction of the light produced by the scintillator element is therefore defective for signal evaluation. Moreover, a portion of the light produced by the scintillator element passes into the inactive zones present between the photodiodes and so this fraction of the light produced in the scintillator element is lost for signal evaluation.

In order to counteract these effects at least in part, to date a scintillator array and a photodiode array have been connected with the aid of an optically adjustable position system in order to achieve the best possible layer thickness of the optical coupling layer in the form of the adhesive. The optimal layer thickness constitutes a compromise in this case. In order to avoid the crosstalk, the layer thickness of the coupling layer should be as small as possible.

On the other hand, however, a minimum layer thickness of the adhesive is necessary with regard to the technical feasibility, interspace between the scintillator array and the photodiode array requiring to be completely filled up despite planarity tolerances of the components and the viscosity of the adhesive, in order to achieve coupling of the scintillator array to the photodiode array. There proves to be a problem here in achieving a uniform layer thickness of the adhesive over the entire detector module comprising the scintillator array and the photodiode array.

SUMMARY

It is an object of at least one embodiment of the invention to specify a detector and an imaging unit having a detector, in the case of which the connection between a scintillator and a photodiode is improved.

According to at least one embodiment of the invention, the object relating to the detector is achieved by way of a detector having at least one scintillator and at least one photodiode which are connected to one another by a connecting medium, the scintillator having a defined depression for holding the connecting medium on its side facing the photodiode. In contradistinction to a scintillator and detectors having a photodiode, in the case of which a substantially flat surface of a scintillator is connected via a connecting medium to a substantially flat surface of a photodiode, the detector according to the invention has a scintillator that is of concave profile on its side facing the photodiode.

The scintillator thus has a depression that holds the connecting medium for connecting the scintillator to the photodiode. Consequently, no flat layer of a connecting medium occurs between the scintillator and the photodiode in the case of the detector according to at least one embodiment of the invention. Rather, the scintillator rests on the photodiode or on the inactive zone surrounding the photodiode, with its edge surfaces surrounding the depression, or with the inactive area surrounding the scintillator, while the connecting medium located in the depression in the scintillator produces the connection between the scintillator and the photodiode.

In particular, the light produced in the scintillator is focused or directed onto the photodiode, preferably in the direction of the center of the photodiode, owing to the fact that the depression in the scintillator has a definite design, that is to say is not arbitrary. Consequently, less light is lost through crosstalk into inactive areas, or less light is lost through crosstalk into adjacent photodiodes when, according to one variant of at least one embodiment of the invention, the detector includes a scintillator array and a photodiode array. In addition, a defined design of the depression is understood to mean that the depression conforms to specific prescribable dimensions within a prescribable tolerance limit.

According to a further variant of at least one embodiment of the invention, the depression is an inwardly directed groove of triangular cross section. Owing to this configuration of the depression, it is possible, in particular, to enhance the focusing of the light produced in the scintillator in the direction of the center of the photodiode assigned to the scintillator.

The same can be achieved when, according to variants of at least one embodiment of the invention, the depression is inwardly directed in a pyramidal or conical shape, or when the depression is an inwardly directed, rounded camber. In all these cases, it is possible to focus the light produced in the scintillator, it being simultaneously possible to connect the scintillator and photodiode via a gap of small thickness for the connecting medium.

In accordance with one embodiment of the invention, the connecting medium is an adhesive that fills up the depression in a scintillator and produces the connection with the photodiode assigned to the scintillator.

The detector is primarily provided for an imaging unit, which is preferably an X-ray unit in which the detector is designed as an X-ray detector. The detector according to at least one embodiment of the invention proves to be particularly suitable for a computed tomography unit.

BRIEF DESCRIPTION OF THE DRAWINGS

Example embodiments of the invention are illustrated in the attached schematic drawings, in which.

DETAILED DESCRIPTION OF THE EXAMPLE EMBODIMENTS

Figure 1:
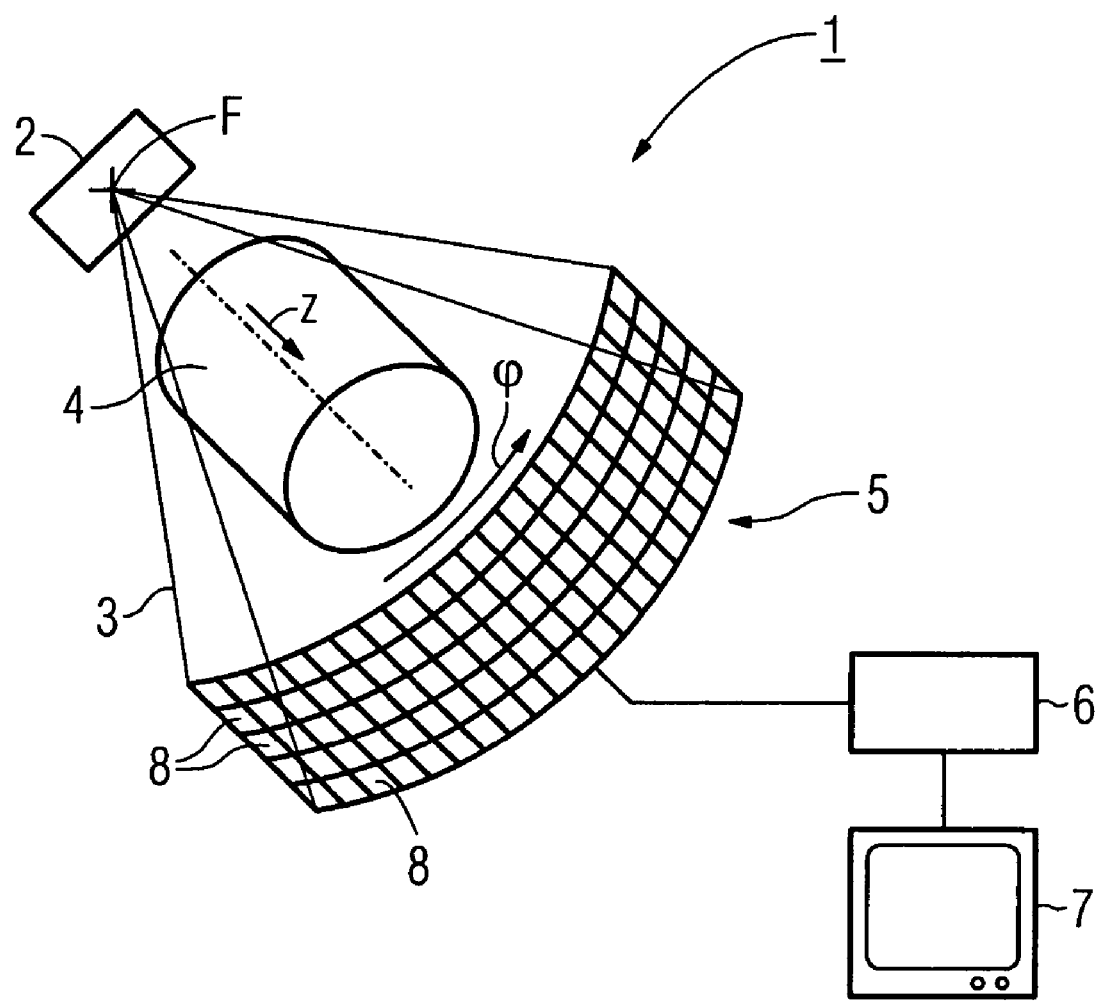
FIG. 1 shows a schematic, in part block diagram, of an imaging unit in the form of a computed tomography unit.

FIG. 1 shows a schematic, in part block diagram, of an imaging unit in the form of a computed tomography unit 1. The computed tomography unit 1 includes an X-ray source 2 from whose focus F there emanates an X-ray beam 3, which is formed in a fan-shaped or pyramidal fashion by diaphragms that are not illustrated in FIG. 1 but are known per se. The X-ray beam 3 penetrates an examination object 4 that is to be examined, and impinges on an X-ray detector 5. The X-ray source 2 and the X-ray detector 5 are arranged, in a way not illustrated in FIG. 1, situated opposite one another on a rotary frame of the computed tomography unit 1, which rotary frame can be rotated in the φ-direction above the system axis Z of the computed tomography unit 1.

During operation of the computed tomography unit 1, the X-ray source 2 arranged on the rotary frame and the X-ray detector 5 rotate about the examination object 4, X-ray pictures of the examination object 4 being obtained from different projection directions. Here, with each projection X-radiation that has passed through the examination object 4 and been attenuated by its passage through the examination object impinges on the X-ray detector 5, the X-ray detector 5 generating signals that correspond to the intensity of the impinging X-radiation. Subsequently, an image computer 6 uses the signals determined by the X-ray detector 5 in order to calculate in a known way, one or more two- or three-dimensional images of the examination object 4 that can be displayed on a display device 7.

Figure 2:
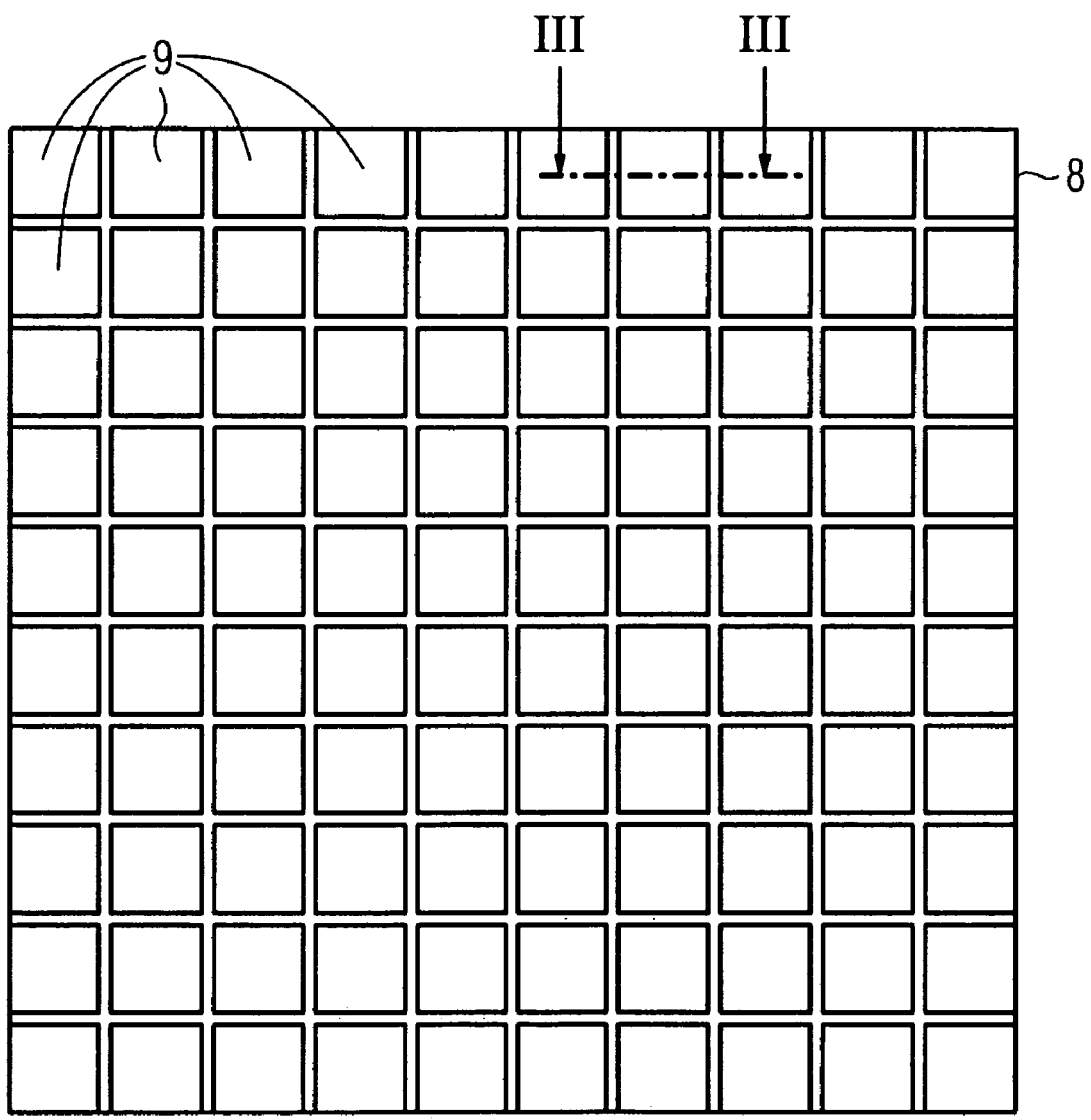
FIG. 2 shows a plan view of a detector module of the computed tomography unit from FIG. 1.

In the case of the present example embodiment, the X-ray detector 5 has a multiplicity of detector modules 8 that are arranged next to one another in the φ-direction and in the Z-direction and form the X-ray detector 5. A detector module 8 is illustrated in plan view in FIG. 2. It is to be seen from FIG. 2, that the detector module 8 has a multiplicity of detector elements 9 that are likewise arranged in rows and columns.

A detector module 8 thus includes an array of detector elements 9, the array of detector elements 9 being formed, inter alia, by a scintillator array and a photodiode array that are aligned relative to one another and are connected to one another by a connecting medium. This is to be seen, in particular, from FIG. 3, which shows a view in the direction of the arrows III of the section from FIG. 2.

Figure 3:
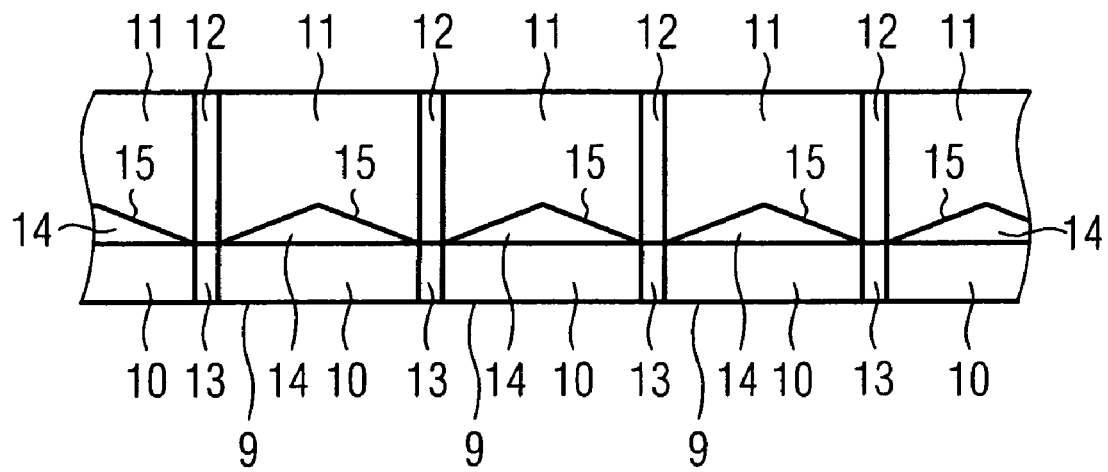
FIG. 3 shows a sectional view in the direction of the arrows III of the detector module shown in FIG. 2.

As may be seen from FIG. 3, each detector element 9 has a scintillator element 11 arranged over a photodiode 10. The scintillator elements 11 are separated from one another by inactive regions, the so-called septa 12. Comparable inactive zones 13 are also located between the photodiodes 10 of the photodiode array.

As already mentioned, the scintillator array and the photodiode array are connected to one another via a connecting medium which is generally an adhesive, for example EPO-TEC 301. According to at least one embodiment of the invention, each scintillator element 11 of the scintillator array has a depression 15 for holding the adhesive 14. In the case of the present example embodiment, each scintillator element 11 has a depression 15 in the form of an inwardly directed groove of triangular cross section that extends along each scintillator element or, in the case of the present example embodiment, even along each row of scintillator elements.

Figure 5:
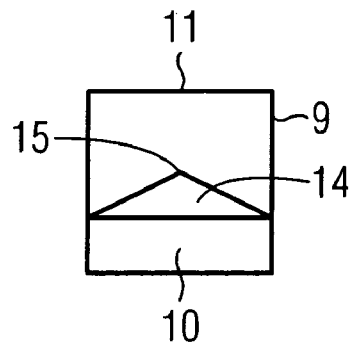
FIGS. 5 to 10 show views of various types of depressions.
Figure 6:
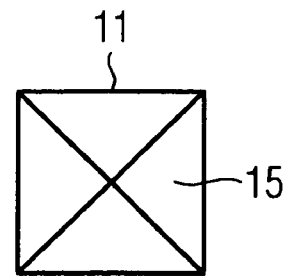
Figure 7:
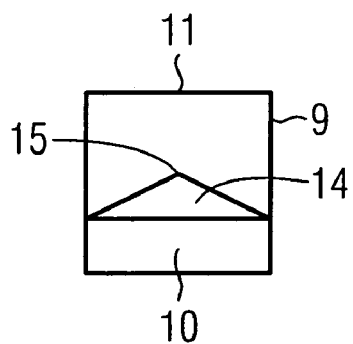
Figure 8:
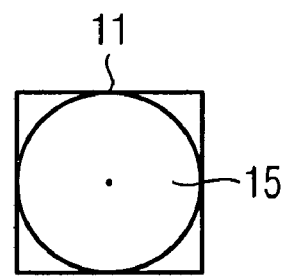
Figure 9:
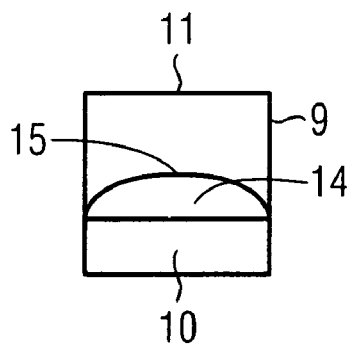
Figure 10:
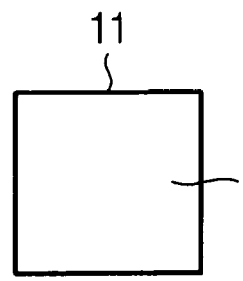

The depression can, however, also be inwardly directed in the shape of a pyramid (compare FIGS. 5 and 6) or cone (FIGS. 7 and 8) for each scintillator element. Likewise suitable as a depression is an inwardly directed, rounded camber (compare FIGS. 9 and 10). These types of depressions are respectively illustrated for a detector element 9 in a sectional view comparable to FIG. 3, and in a view from below onto the scintillator element 11 of the respective detector element 9 in FIGS. 5 to 10. Various shapes of depressions can also be combined with one another, depending on the application.

The concave profiles, to be recognized in cross section, of each scintillator element 11 provide the preconditions for being able, upon bonding of the scintillator array to the photodiode array, to produce direct contacts between the inactive regions 12 of the scintillator array and the inactive zones 13 of the photodiode array. However, the bonding is performed in the region of the concave profiles, that is to say in the regions of the depressions 15 of the scintillator elements 11 in which the adhesive 14 is located.

Figure 4:
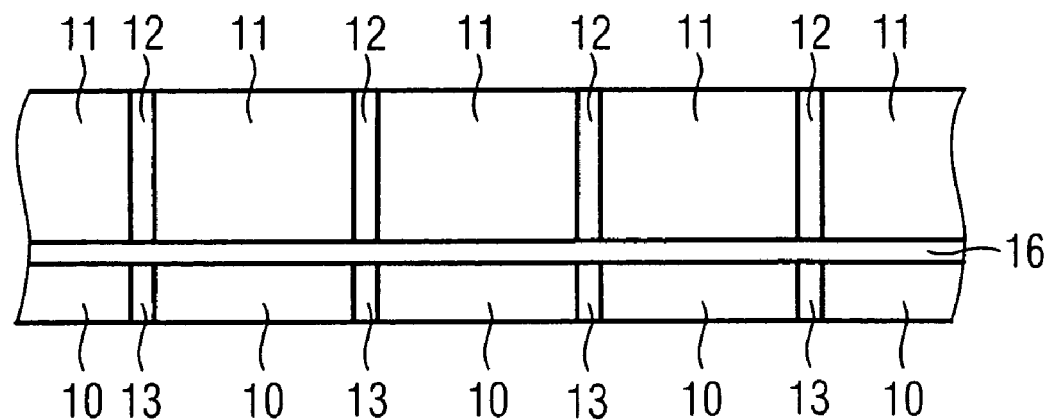
FIG. 4 shows a view, comparable to FIG. 3, of a detector module according to the prior art.

This results in some advantages by comparison with the prior art illustrated for comparison in FIG. 4. In this case, FIG. 4 shows, in a view comparable to FIG. 3, a section through an array of detector elements according to the prior art. To simplify, the same or similar components are provided here with the same reference numerals. Whereas according to the prior art the scintillator array and the photodiode array are connected to one another with a continuous adhesive layer 16, in the case of the detector according to at least one embodiment of the invention, as already mentioned, this is performed essentially only in the region of the depressions of the scintillator elements 11. In this way, the gap to be filled up with the adhesive is defined by the direct contact of the inactive regions of the scintillator array and the inactive zones of the photodiode array, which is not the case according to the prior art.

Moreover, it is possible to match planarity tolerances of photodiode array and scintillator array to one another. Apart from a slighter thickness of the adhesive gap, a great advantage ensues from the fact that the optical crosstalk between adjacent detector elements via the adhesive is clearly reduced. Owing to the concave shaping of the light exit surface of a scintillator element 11, the visible light produced by the scintillator element in consequence of the impingement of X-radiation is substantially focused in the direction of the photodiode 10 assigned to the scintillator element 11. The visible light is preferably even focused in the direction of the center of the assigned photodiode 10. As a result, on the one hand less light is lost in the inactive zones 13 of the photodiodes 10, and on the other hand less light passes undesirably to a neighboring photodiode 10.

At least one embodiment of the invention has been described above on the example of an X-ray detector. However, embodiments of the invention can also be applied to other detectors that have a scintillator and a photodiode arranged downstream of the scintillator.

Apart from a computed tomography unit, the detector according to at least one embodiment of the invention is also suitable for other X-ray units, for example C-arc X-ray units.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A detector, comprising:
    at least one scintillator; and
    at least one photodiode, connected to the at least one scintillator by a connecting medium, the scintillator including a defined depression on a side of the scintillator facing the photodiode, the defined depression for holding the connecting medium on the side facing the photodiode, the depression being formed such that a light exit surface of the scintillator has a concave shape.

2. The detector as claimed in claim 1, comprising a scintillator array and a photodiode array.

3. The detector as claimed in claim 2, wherein the depression is an inwardly directed groove of triangular cross section.

4. An imaging unit including a detector as claimed in claim 2.

5. An X-ray unit including a detector as claimed in claim 2, wherein the detector is an X-ray detector.

6. A computed tomography unit including a detector as claimed in claim 2.

7. The detector as claimed in claim 1, wherein the depression is an inwardly directed groove of triangular cross section.

8. The detector as claimed in claim 1, wherein the depression is inwardly directed in at least one of a pyramidal and conical shape.

9. The detector as claimed in claim 1, wherein the depression is and inwardly directed, rounded camber.

10. The detector as claimed in claim 1, wherein the connecting medium is an adhesive.

11. An imaging unit including a detector as claimed in claim 1.

12. An X-ray unit including a detector as claimed in claim 1, wherein the detector is an X-ray detector.

13. A computed tomography unit including a detector as claimed in claim 1.

14. A detector, comprising:
    at least one scintillator; and
    at least one photodiode, connected to the at least one scintillator by a connecting medium, the scintillator including means for holding the connecting medium on a side of the scintillator facing the photodiode, the means for holding being formed on the side of the scintillator facing the photodiode, and being formed such that a light exit surface of at least one scintillator has a concave shape.

15. The detector as claimed in claim 14, comprising a scintillator array and a photodiode array.

16. A detector comprising:
    a scintillator array having a plurality of scintillator elements, each of the plurality of scintillator elements being connected to at least one photodiode by a connecting medium, each of the plurality of scintillating elements having a light exit surface oriented toward the at least one photodiode and including a defined depression facing the photodiode, the depression being designed to hold the connecting medium, and depression being formed such that the light exit surface of each scintillating element has a concave shape.

* * * * *